US012186838B2

(12) United States Patent
Kim et al.

(10) Patent No.: US 12,186,838 B2
(45) Date of Patent: Jan. 7, 2025

(54) HORN FIXING DEVICE AND HORN FIXING METHOD OF SECONDARY BATTERY TAP ULTRASONIC WELDING DEVICE

(71) Applicant: MPLUS CORP., Cheongun-si (KR)

(72) Inventors: Jong Sung Kim, Seongnam-si (KR); Kang Ho Ko, Seoul (KR)

(73) Assignee: MPLUS CORP., Cheongun-si (KR)

( * ) Notice: Subject to any disclaimer, the term of this patent is extended or adjusted under 35 U.S.C. 154(b) by 257 days.

(21) Appl. No.: 17/975,322

(22) Filed: Oct. 27, 2022

(65) Prior Publication Data

US 2024/0139888 A1 May 2, 2024

(51) Int. Cl.
*B23K 37/02* (2006.01)
*B06B 3/00* (2006.01)
*B23K 20/10* (2006.01)
*H01M 50/56* (2021.01)
*B23K 37/04* (2006.01)
*H01M 50/566* (2021.01)

(52) U.S. Cl.
CPC ............ *B23K 37/0241* (2013.01); *B06B 3/00* (2013.01); *B23K 20/106* (2013.01); *B23K 37/0435* (2013.01); *H01M 50/566* (2021.01)

(58) Field of Classification Search
CPC .............. B23K 37/0241; B23K 20/106; B23K 37/0435; B23K 37/0443; B23K 20/10; B06B 3/00; F16L 21/06; F16L 3/1091; H01M 50/566
See application file for complete search history.

(56) References Cited

U.S. PATENT DOCUMENTS

| | | | | |
|---|---|---|---|---|
| 4,283,152 A | * | 8/1981 | Smith | ...... F16B 7/048 403/3 |
| 5,480,193 A | * | 1/1996 | Echols | ...... F16L 21/06 285/423 |
| 6,588,714 B2 | * | 7/2003 | Blane | ...... F16L 3/1091 248/68.1 |

(Continued)

FOREIGN PATENT DOCUMENTS

| | | | | |
|---|---|---|---|---|
| CA | 2909910 A1 | * | 7/2014 | ............ H02G 7/053 |
| KR | 101697198 B1 | | 1/2017 | |
| KR | 102072853 B1 | | 2/2020 | |

(Continued)

*Primary Examiner* — Tan Le
(74) *Attorney, Agent, or Firm* — NKL LAW; Jae Youn Kim (57) ABSTRACT

Provided is a horn fixing device of an ultrasonic welding device for a secondary battery tab, the horn fixing device including an amplifier for ultrasonic welding of the secondary battery tab, a fixing block member having an amplifier through hole formed therein and configured to allow the amplifier to be installed therethrough, the fixing block member having a pad insertion space part formed at an upper portion of the amplifier through hole, wherein the pas insertion space allows an amplifier compression member to be installed therein, and the amplifier compression member installed in the pad insertion space part so as to compress the amplifier placed in the amplifier through hole, and a setting block member installed on one surface of the fixing block member to adjust an angle of the amplifier. The horn fixing device has an effect of uniformly pressing the amplifier by a press pad unit.

8 Claims, 9 Drawing Sheets

(56) References Cited

U.S. PATENT DOCUMENTS 7,309,054 B2 * 12/2007 Slatter .................... A01K 97/10
248/521
2022/0040784 A1 * 2/2022 Wenning .............. B23K 20/106

FOREIGN PATENT DOCUMENTS

| KR | 20200107280 A | | 9/2020 |
|---|---|---|---|
| KR | 20230122439 A | * | 8/2023 |

* cited by examiner

HORN FIXING DEVICE AND HORN FIXING METHOD OF SECONDARY BATTERY TAP ULTRASONIC WELDING DEVICE

BACKGROUND OF THE INVENTION

Field of the Invention

The present invention relates to a horn fixing device and a horn fixing method of an ultrasonic welding device for a secondary battery tab, and more particularly to a horn fixing device and a horn fixing method of an ultrasonic welding device for a secondary battery tab, configured to easily adjust an angle of a horn for ultrasonic welding of the secondary battery tab and to adjust the angle of the horn quickly and stably without any deviation of the angle thereof.

Description of the Related Art

In general, as one of the secondary batteries, there is a pouch-type secondary battery having a battery cell embedded in a pouch.

The pouch-type secondary battery accommodates the battery cell in the pouch instead of a metal can, thereby improving stability thereof and reducing weight thereof.

Since the pouch-type secondary battery is used by filling the inside thereof with electrolytes, an electrode tab having a function of connecting a battery element to the outside is welded to a grid of the battery cell (jelly roll), and the same is exposed to the outside of the pouch-type secondary battery. Ultrasonic welding is widely used as a method of welding the electrode tab to the grid of the battery cell.

However, in the related art, it takes about 30 to 50 minutes to complete parallel setting between a horn in an ultrasonic welding unit and an anvil. Although the ultrasonic welding unit of the related art includes an adjustment bolt having a function of adjusting a horn angle, there are still problems in that the horn angle is not finely adjusted using the adjustment bolt and the horn angle deviates when a clamp bolt is fastened.

The reasons for the above-described problems are that accurate measurement is not performed because a spindle of an indicator is not in the vertical direction of a radius of rotation, and a horn angle deviates because a setting block and the adjustment bolt may not withstand force generated when clamp-fastening of a fixing block is performed with the setting block and the adjustment bolt.

As a result, although a horn angle setting unit of the related art includes the adjustment bolt and the indicator so as to perform angle adjustment, a measurement value of the indicator is different from an actual rotation amount, and the setting block is not fixed, which causes long setting time because a deviation amount of a horn angle increases when the fixing block is fastened. Further, when horizontal setting is performed, it is required to perform the horizontal setting using a copper hammer while visually checking the state thereof.

Meanwhile, the present applicant discloses a horn angle adjustment device and a horn angle adjustment method of an ultrasonic welding device, configured to facilitate setting of an amplifier and a horn in a narrow space and to reduce a deviation amount of a horn angle when a bolt is fastened from the top for clamp-fastening. However, there is also a problem in that the amplifier should be repeatedly set using an indicator.

For example, KR 10-2072853 (PTD 1) discloses "a horn parallelism setting device of an ultrasonic welding device".

The horn parallelism setting device of the ultrasonic welding device disclosed in PTD 1 includes an anvil reference setting block placed on the upper surface of an anvil, a horn parallel setting block placed on the upper surface of a horn, setting block opposite-sides measurement units respectively installed to be positioned on the upper surfaces of opposite sides of the anvil reference setting block or the horn parallel setting block with a predetermined distance therebetween and configured to measure a distance between the opposite sides of the anvil reference setting block or the horn parallel setting block, a horn angle correction unit configured to correct an angle of the horn based on the anvil so that the horn maintains a parallel state with the anvil, and a control unit configured to set a reference parallelism from the distance between the opposite sides of the anvil reference setting block measured by the setting block opposite-sides measurement units and to control the horn angle correction unit so that a horn parallelism set from the distance between the opposite sides of the horn parallel setting block measured by the setting block opposite-sides measurement units coincides with the reference parallelism.

RELATED ART DOCUMENT

Patent Document (PTD 1) KR 10-2072853
(PTD 2) KR 10-2020-0107280
(PTD 3) KR 10-1697198

SUMMARY OF THE INVENTION

Therefore, the present invention has been made in view of the above problems, and it is an object of the present invention to provide a horn fixing device and a horn fixing method of an ultrasonic welding device for a secondary battery tab, configured to stably install an amplifier in a fixing block of the ultrasonic welding device without deviation of the amplifier.

It is another object of the present invention to provide a horn fixing device and a horn fixing method of an ultrasonic welding device for a secondary battery tab, configured to quickly install an amplifier without deviation of the amplifier or a change in angle thereof due to pressure (or external force) applied to the inside of a fixing block member in the vertical direction.

It is a further object of the present invention to provide a horn fixing device and a horn fixing method of an ultrasonic welding device for a secondary battery tab, configured to stably install an amplifier without deviation of the amplifier or without repeated adjustment of an angle of the amplifier.

In accordance with an aspect of the present invention, the above and other objects can be accomplished by the provision of a horn fixing device of an ultrasonic welding device for a secondary battery tab, the horn fixing device including an amplifier for ultrasonic welding of the secondary battery tab, a fixing block member having an amplifier through hole formed therein and configured to allow the amplifier to be installed therethrough, the fixing block member having a pad insertion space part formed at an upper portion of the amplifier through hole, wherein the pad insertion space allows an amplifier compression member to be installed therein, the amplifier compression member installed in the pad insertion space part so as to compress the amplifier placed in the amplifier through hole, and a setting block member installed on one surface of the fixing block member to adjust an angle of the amplifier.

The fixing block member may include a lower block and an upper block separately formed in a vertical direction to place the amplifier therebetween, the amplifier through hole formed to allow the amplifier to be installed through the lower block and the upper block, the pad insertion space formed to extend at an upper portion of the amplifier through hole and configured to allow the amplifier compression member to be installed therein, guide bolt holes formed to be spaced apart from each other by a predetermined distance on an upper surface of the upper block and configured to enable guide bolts to be fastened to the amplifier compression member therethrough, and a plurality of compression bolt holes formed to be spaced apart from each other by a predetermined distance on the upper surface of the upper block so as to press the amplifier compression member in the vertical direction and compress the amplifier compression member therethrough.

The amplifier compression member may include a pressure pad unit installed in the pad insertion space part, and a compression bolt unit configured to enable the pressure pad unit to press and fix the amplifier, wherein the pressure pad unit may include a pressure pad body formed in a predetermined shape, an amplifier compression surface formed to correspond to an upper surface of the amplifier, and guide bolt holes formed in an upper surface of the pressure pad body and configured to allow guide bolts of the compression bolt unit to be fastened thereto.

The compression bolt unit may include the guide bolts respectively fastened to the guide bolt holes, guide pins respectively installed on outer sides of the guide bolts to facilitate insertion of the guide bolts, first compression bolts respectively fastened to a plurality of compression bolt holes formed on an upper surface of an upper block, wherein the first compression bolts press the pressure pad body to allow the amplifier compression surface to compress the amplifier, and second compression bolts respectively fastened to upper portions of the first compression bolts so as to press the first compression bolts respectively fastened to the compression bolt holes.

The setting block member may include a setting block member installed on the one surface of the fixing block member to adjust the angle of the amplifier, and an angle adjustment unit installed in the setting block to adjust the angle of the amplifier passing through the setting block, wherein the setting block may include a through hole formed to allow the amplifier to be installed therethrough, a cutout portion formed to be cut out on an upper portion of the setting block so that the amplifier is press-fitted therein, a horizontal bolt hole formed at the upper portion of the setting block so that the amplifier is compressed by pressure of the cutout portion, and an insert hole formed on one lower portion of the setting block and configured to enable the angle adjustment unit to be installed in the setting block.

The plurality of compression bolt holes may be formed in a row at a predetermined distance along a center line of the upper surface of the upper block, a center line of an ultrasonic oscillator and the amplifier and the center line of the upper surface of the upper block may be parallel to each other, and the compression bolt holes may be formed to vertically intersect the center line of the ultrasonic oscillator and the amplifier.

The compression bolt holes may be configured to vertically intersect tightening directions of the first compression bolts with a center line of an ultrasonic oscillator and the amplifier so as to prevent generation of torque that causes the amplifier to deviate from a pre-set angle when each of the first compression bolts is sequentially fastened to a corresponding one of the compression bolt holes, the second compression bolts may be respectively fastened to the upper portions of the first compression bolts so as to prevent the first compression bolts from being loosened due to vibration generated in the ultrasonic oscillator, and, when the first and second compression bolts arranged in a row at an equal distance are fastened, movement directions thereof may vertically pass through the center line of the amplifier so as to prevent generation of torque that causes rotation of the amplifier due to force applied to the amplifier when the first and second compression bolts are fastened, and to minimize deviation of the amplifier from the pre-set angle when the first and second compression bolts are fastened.

In accordance with another aspect of the present invention, there is provided a horn fixing method of an ultrasonic welding device, configured to weld a secondary battery tab using the ultrasonic welding device and to fix a horn, the horn fixing method including inserting a pressure pad unit into a pad insertion space part of a fixing block member, fastening guide bolts to the pressure pad unit so that the pressure pad unit is positioned at a correct position, inserting an amplifier into an amplifier through hole of the fixing block member, fixing a lower block and an upper block by fastening a bolt to a vertical bolt hole of the fixing block member, temporarily and preliminarily fastening each of first compression bolts of a compression bolt unit to a corresponding one of compression bolt holes formed in the upper block to press and fix the amplifier to an extent that an angle of the amplifier is adjustable, adjusting, by an angle adjustment unit, a setting block installed on one side of the fixing block member to obtain an angle suitable for operation of an ultrasonic horn, and respectively fastening the first compression bolts and second compression bolts of the compression bolt unit to the compression bolt holes formed in the upper block to press and fix the amplifier.

The fastening of the first compression bolts and the second compression bolts may include temporarily and preliminarily fastening each of the first compression bolts of the compression bolt unit to the corresponding one of the compression bolt holes formed in the upper block to press and fix the amplifier to the extent that the angle of the amplifier is adjustable, completing the fastening of each of the first compression bolts temporarily and preliminarily fastened to the corresponding one of the compression bolt holes formed in the upper block so that the first compression bolts are in close contact with an upper surface of the pressure pad unit, and fastening each of the second compression bolts to a corresponding one of upper surfaces of the first compression bolts so that the first compression bolts are pressed by the second compression bolts, and fastening the second compression bolts so that the amplifier is pressed by the first compression bolts and the second compression bolts.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE INVENTION

Hereinafter, embodiments of the present invention will be described in detail with reference to the accompanying drawings so that those skilled in the art to which the present invention pertains may easily implement the present invention.

However, since descriptions of the present invention are merely embodiments for structural or functional description, the scope of the present invention should not be construed as being limited by the embodiments described in the context.

For example, since the embodiments may be modified in various ways and may have various forms, it should be understood that the scope of the present invention includes equivalents capable of realizing technical ideas.

In addition, since objects or effects described in the present invention do not mean that a specific embodiment should include all the objects or effects or only such effects, the scope of the present invention should not be construed as being limited thereto.

In this specification, the embodiments are provided to make the disclosure of the present invention complete and to allow those skilled in the art to which the present invention pertains to fully understand the scope of the invention. Further, the present invention is only defined by the scope of the claims.

Accordingly, in some embodiments, well-known components, well-known operations, and well-known techniques have not been specifically described in order to avoid obscuring the description of the present invention.

Meanwhile, the meaning of the terms described in the present invention is not limited to the dictionary meaning, and should be understood as follows.

Unless defined otherwise, all terms used herein, including technical or scientific terms, have the same meaning as generally understood by those skilled in the art to which the present invention pertains.

Terms such as those defined in commonly used dictionaries should be interpreted as having meanings consistent with those in the context of the related art. Unless explicitly defined in the present application, the terms are not interpreted in an ideal or overly formal sense.

Hereinafter, a horn fixing device and a horn fixing method of an ultrasonic welding device for a secondary battery tab according to a preferred embodiment of the present invention will be described in detail with reference to the accompanying drawings.

The horn fixing device of the ultrasonic welding device for the secondary battery tab according to the preferred embodiment of the present invention includes an amplifier 10 for ultrasonic welding of a secondary battery tab, an amplifier through hole 113 having the amplifier 10 installed therethrough, a fixing block member 110 having a pad insertion space part 114 formed at an upper portion of the amplifier through hole 113, wherein the insertion space part 114 allows an amplifier compression member 130 to be installed therein, and the amplifier compression member 130 installed in the pad insertion space part 114 so as to compress the amplifier 10 placed in the amplifier through hole 113.

Figure 1:
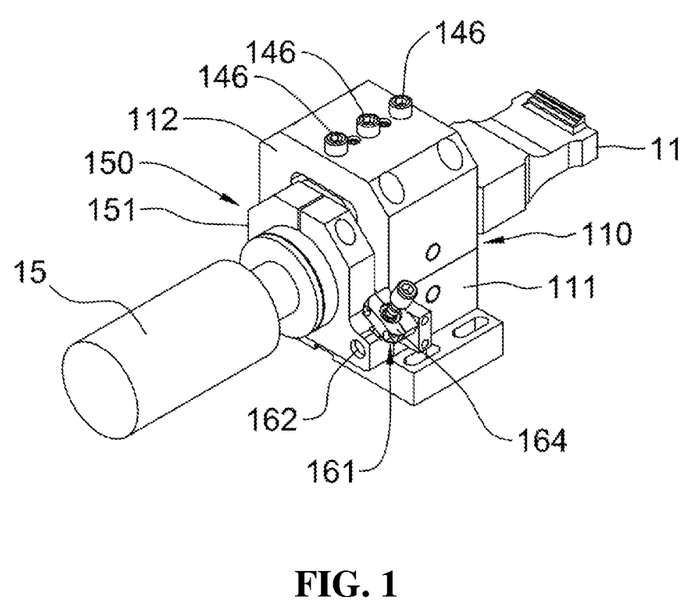
FIG. 1 is a three-dimensional view showing a horn fixing device of an ultrasonic welding device for a secondary battery tab according to a preferred embodiment of the present invention.
Figure 2:
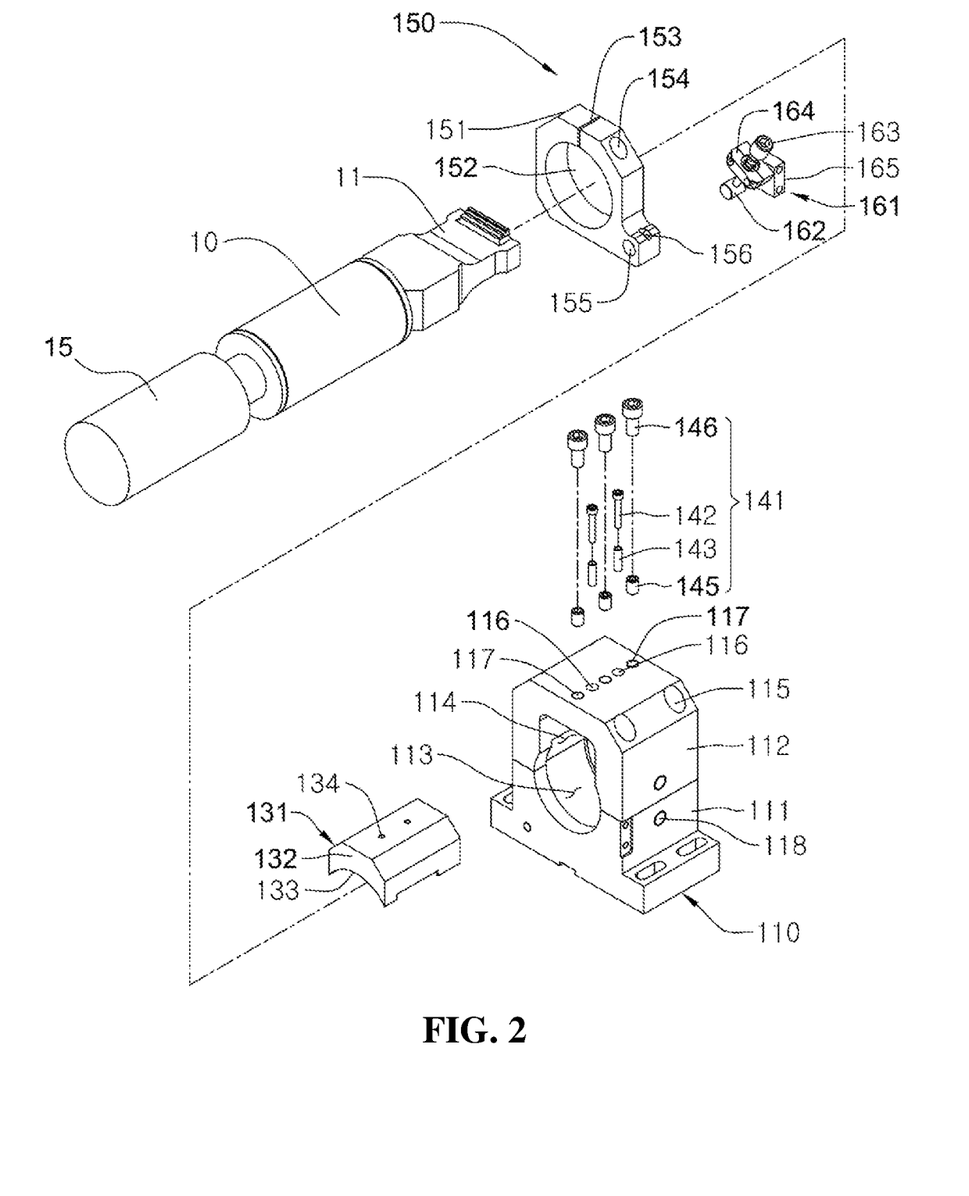
FIG. 2 is an exploded three-dimensional view showing the horn fixing device of the ultrasonic welding device for the secondary battery tab according to the preferred embodiment of the present invention.
Figure 3:
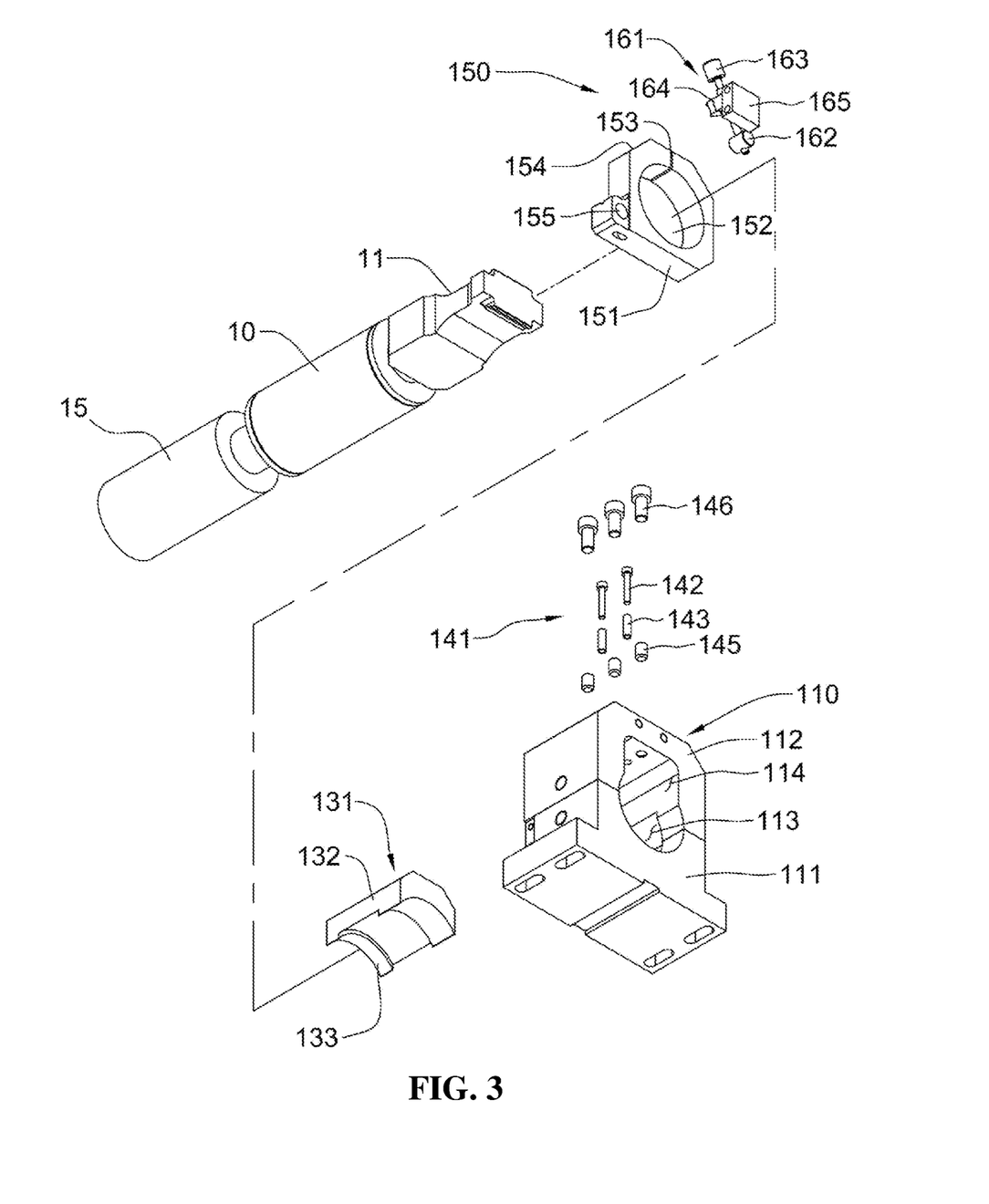
FIG. 3 is a bottom exploded three-dimensional view showing the horn fixing device of the ultrasonic welding device for the secondary battery tab according to the preferred embodiment of the present invention.

FIG. 1 is a three-dimensional view showing a horn fixing device of an ultrasonic welding device for a secondary battery tab according to a preferred embodiment of the present invention, FIG. 2 is an exploded three-dimensional view showing the horn fixing device of the ultrasonic welding device for the secondary battery tab according to the preferred embodiment of the present invention, and FIG. 3 is a bottom exploded three-dimensional view showing the horn fixing device of the ultrasonic welding device for the secondary battery tab according to the preferred embodiment of the present invention.

As shown in FIGS. 1 to 3, the horn fixing device of the ultrasonic welding device according to the embodiment of the present invention includes the fixing block member 110 having the amplifier 10 installed therethrough, the amplifier compression member 130 installed inside the fixing block member 110 to compress and fix the amplifier 10, and a setting block member 150 configured to adjust an angle of the amplifier 10.

The fixing block member 110 includes a lower block 111 and an upper block 112 separately formed to be a lower portion of the fixing block member 110 and an upper portion thereof in a vertical direction so that the amplifier 10 is placed therebetween, the amplifier through hole 113 formed in the lower block 111 and the upper block 112 and configured to allow the amplifier 10 to be installed therethrough, the pad insertion space part 114 formed to extend at an upper portion of the amplifier through hole 113 so as to install the amplifier compression member 130 therein, guide bolt holes 116 formed to be spaced apart from each other by a predetermined distance on the upper surface of the upper block 112 and configured to enable guide bolts 142 to be fastened to the amplifier compression member 130, a plurality of compression bolt holes 117 formed to be spaced apart from each other by a predetermined distance on the upper surface of the upper block 112 so as to press the amplifier compression member 130 in the vertical direction and compress the same.

The fixing block member 110 includes the lower block 111 and the upper block 112, and the lower block 111 and the lower block 112 are respectively formed to be a lower portion of the fixing block member 110 and an upper portion thereof in the vertical direction based on an imaginary horizontal line of the center of the amplifier through hole 113.

The amplifier through hole 113 is formed in the center of the lower block 111 and the upper block 112 to insert the amplifier 10 through the amplifier through hole 113, and the pad insertion space part 114 is formed in the upper block 112 and allows a pressure pad unit 131 configured to compress and fix the amplifier 10 to be installed therein.

That is, the pad insertion space part 114 is formed in an inner upper portion of the upper block 112, and the pressure pad unit 131 configured to compress the amplifier 10 with uniform pressure is installed in the pad insertion space part 114.

Vertical bolt holes 115 are formed on opposite sides of the upper surface of the upper block 112 so that the upper block 112 is coupled to the lower block 111, and of course, bolts (not shown) fastened to the lower block 111 are respectively fastened to the vertical bolt holes 115.

In addition, the guide bolt holes 116 and the compression bolt holes 117 are formed to be spaced apart from each other by a predetermined distance on the upper surface of the upper block 112, thereby enabling a compression bolt unit 141 of the amplifier compression member 130 to be fastened thereto.

That is, two guide bolt holes 116 are formed, and three compression bolt holes 117 are formed between and outside the guide bolt holes 116.

A plurality of the compression bolt holes 117 may be formed, and for example, more than two compression bolt holes 117 may be formed, as necessary. The plurality of compression bolt holes 117 are formed in a row at a predetermined distance along a center line of the upper surface of the upper block 112. Here, a center line of an ultrasonic oscillator 15 and the amplifier 10 and the center line of the upper surface of the upper block 112 are parallel to each other. The compression bolt holes 117 are formed to vertically intersect the center line of the ultrasonic oscillator 15 and the amplifier 10.

Accordingly, when first compression bolts 145 are sequentially fastened to the compression bolt holes 117, it is possible to prevent generation of torque that causes the amplifier 10 to deviate from a preset angle thereof, that is, to prevent a change in the preset angle of the amplifier 10. For this reason, a tightening direction of each of the first compression bolts 145 is configured to vertically intersect the center line of the ultrasonic oscillator 15 and the amplifier 10.

In addition, a horizontal bolt hole 118 is formed in one surface side of the upper block 112, and a bolt (not shown) may be fastened to the horizontal bolt hole 118.

Figure 4:
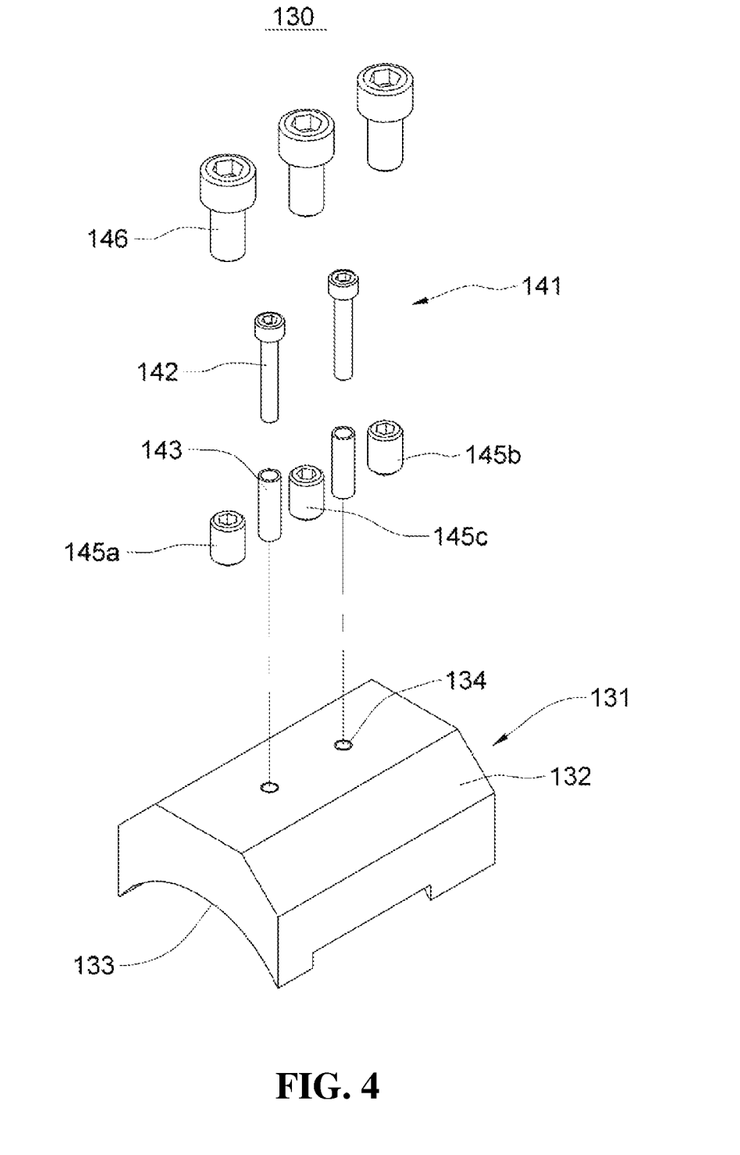
FIG. 4 is an exploded three-dimensional view showing an amplifier compression member of the horn fixing device of the ultrasonic welding device for the secondary battery tab according to the preferred embodiment of the present invention.
Figure 5:
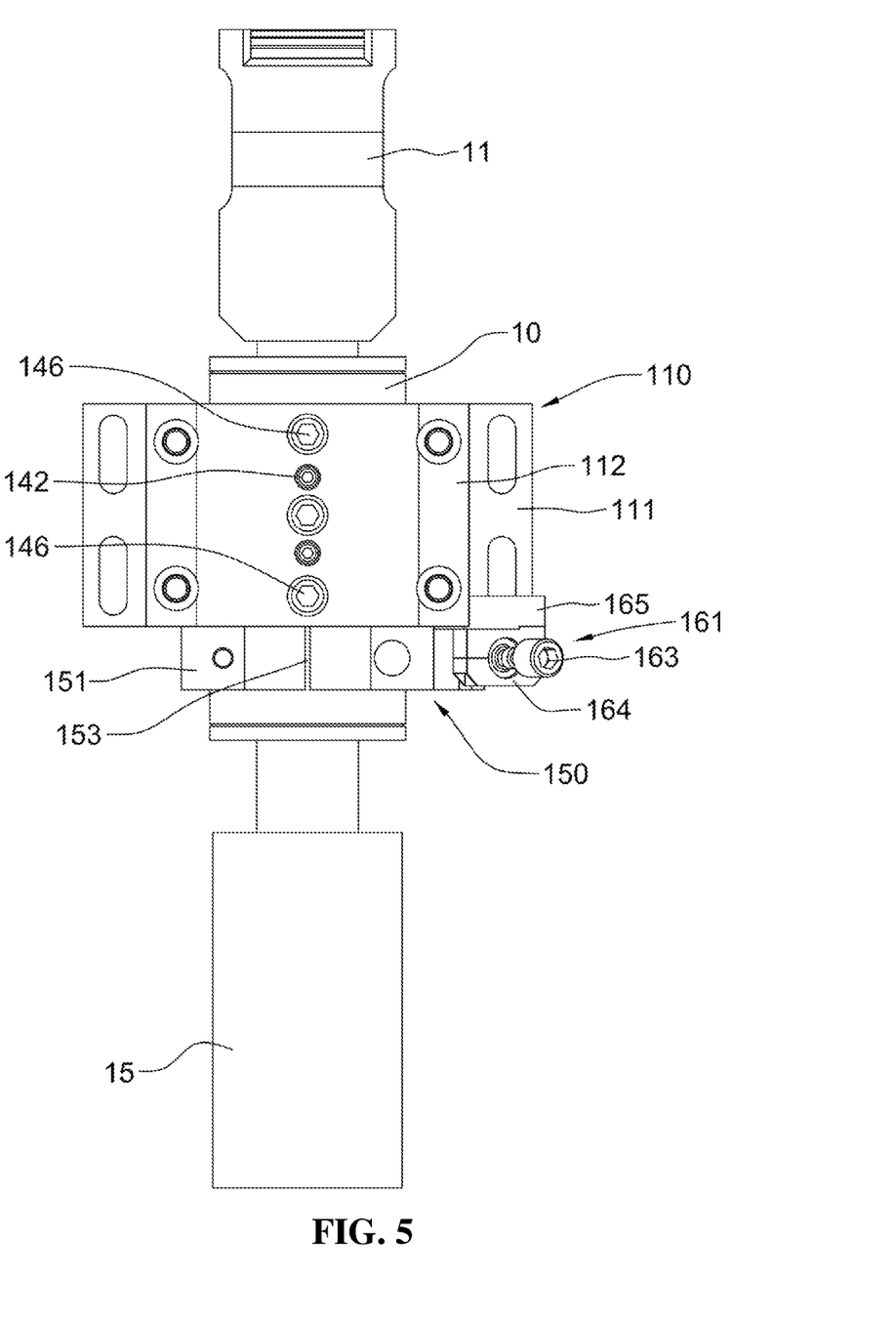
FIG. 5 is a plan view showing the horn fixing device of the ultrasonic welding device for the secondary battery tab according to the preferred embodiment of the present invention.
Figure 6:
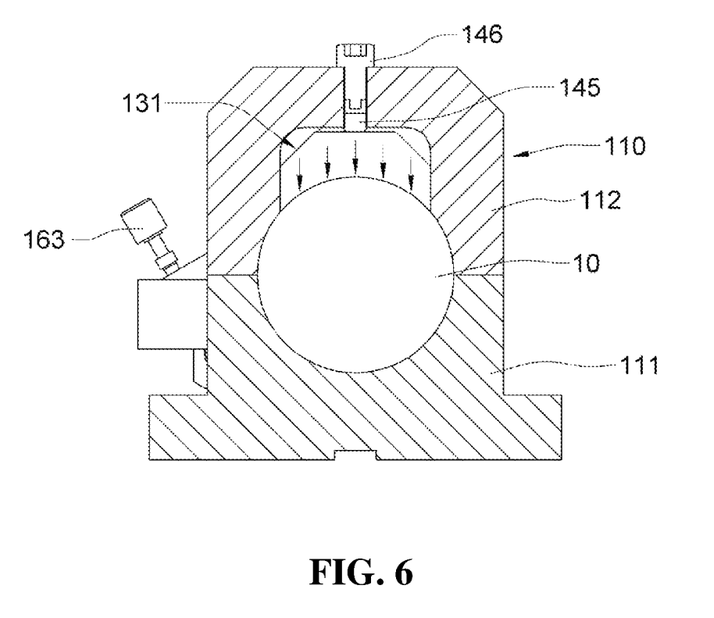
FIG. 6 is a cross-sectional view showing the horn fixing device of the ultrasonic welding device for the secondary battery tab according to the preferred embodiment of the present invention.
Figure 7:
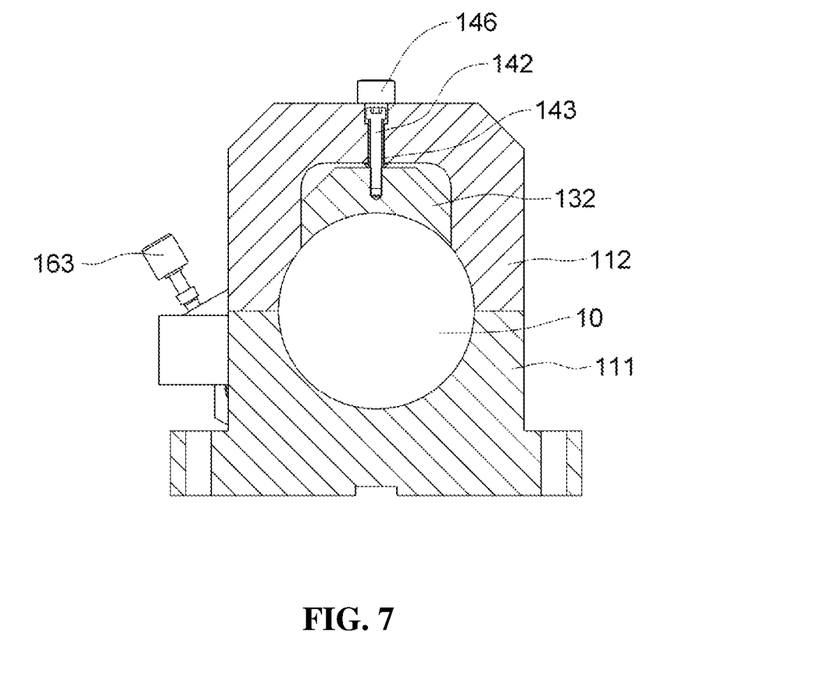
FIG. 7 is a cross-sectional view showing the horn fixing device of the ultrasonic welding device for the secondary battery tab according to the preferred embodiment of the present invention.

FIG. 4 is an exploded three-dimensional view showing the amplifier compression member of the horn fixing device of the ultrasonic welding device for the secondary battery tab according to the preferred embodiment of the present invention, FIG. 5 is a plan view showing the horn fixing device of the ultrasonic welding device for the secondary battery tab according to the preferred embodiment of the present invention, FIG. 6 is a cross-sectional view showing the horn fixing device of the ultrasonic welding device for the secondary battery tab according to the preferred embodiment of the present invention, and FIG. 7 is a cross-sectional view showing the horn fixing device of the ultrasonic welding device for the secondary battery tab according to the preferred embodiment of the present invention.

As shown in FIGS. 4 to 7, in order to quickly and accurately fix the position of the amplifier 10 installed in the amplifier through hole 113, the amplifier compression member 130 is configured so that pressure (or external force) of fixing bolts applied to the amplifier 10 is uniformly applied thereto to prevent deviation of the amplifier 10 from a preset angle thereof when the fixing bolts are fastened, thereby making it possible to significantly reduce time of setting the amplifier 10 therein.

The amplifier compression member 130 includes the pressure pad unit 131 installed in the pad insertion space part 114, and the compression bolt unit 141 configured to allow the pressure pad unit 131 to press and fix the amplifier 10.

The pressure pad unit 131 includes a pressure pad body 132 formed in a predetermined shape, an amplifier compression surface 133 formed to correspond to the upper surface of the amplifier 10, and guide bolt holes 134 formed in the upper surface of the pressure pad body 132 and configured to allow the guide bolts 142 of the compression bolt unit 141 to be respectively fastened thereto.

In addition, the compression bolt unit 141 includes the guide bolts 142 respectively fastened to the guide bolt holes 134 and guide pins 143 respectively installed on the outer sides of the guide bolts 142 to facilitate insertion of the guide bolts 142. Further, the compression bolt unit 141 includes the first compression bolts 145 respectively fastened to the plurality of compression bolt holes 117 formed on the upper surface of the upper block 112 so that the same presses the pressure pad body 132 to allow the amplifier compression surface 133 to compress the amplifier 10, and second compression bolts 146 respectively fastened to upper portions of the first compression bolts 145 so as to press the first compression bolts 145 respectively fastened to the compression bolt holes 117.

As described above, each of the second compression bolts 146 is fastened to a corresponding one of the first compression bolts 145, thereby making it possible not only to prevent the first compression bolts 145 from being loosened due to vibration generated in the ultrasonic oscillator 15, but also to prevent the preset angle of the amplifier 10 from deviating due to a difference in fastening force by allowing the first compression bolts 145 to be respectively fastened to the compression bolt holes 117 through the fixing block member 110 so as to uniformly distribute the pressure applied to the amplifier compression member 130.

The amplifier compression member 130 may uniformly press the amplifier 10 using the pressure pad unit 131, and may stably fix the amplifier 10 using the compression bolts 145 and 146 fastened in the vertical direction.

The overall shape of the pressure pad body 132 of the pressure pad unit 131 is formed in a "∩" shape, and the pressure pad body 132 has the amplifier compression surface 133 formed on the bottom surface thereof. Here, the amplifier compression surface 133 is formed in the same arc as the amplifier 10.

As shown in FIG. 6, the amplifier compression surface 133 is uniformly in close contact with the outer surface of the amplifier 10, and in this state, the amplifier 10 is compressed and fixed while pressure of the amplifier compression surface 133 applied in the vertical direction is evenly distributed to the amplifier 10.

The guide bolt holes 134 are formed on the upper surface of the pressure pad body 132 to allow the guide bolts 142 to be respectively fastened thereto, and the guide bolt holes 134 are formed of two holes.

The pressure pad body 132 is compressed and fixed to the amplifier 10 by the compression bolts 145 and 146 fastened to the upper block 112.

The compression bolt unit 141 includes the two guide bolts 142 corresponding to the two guide bolt holes 134, and the guide pins 143 are provided to enable the guide bolts 142 to be easily fastened to the upper block 112.

Each of the guide pins 143 is fitted into and coupled to a corresponding one of the guide bolt holes 134, and each of the guide bolts 142 passes through a corresponding one of the guide pins 143 to be fastened to a corresponding one of the guide bolt holes 134 formed in the pressure pad unit 131.

The guide bolts 142 move the pressure pad unit 131 in the upper block 112 downwards by the fastening of the first compression bolts 145, thereby allowing the pressure pad body 132 of the pressure pad unit 131 to compress the amplifier 10.

As shown in FIG. 4, the compression bolt unit 141 includes the guide bolts 142 respectively fastened to the guide bolt holes 134, and the compression bolts 145 and 146 respectively fastened to the compression bolt holes 117 formed on the upper surface of the upper block 112.

As shown in FIG. 7, each of the guide bolts 142 is formed to have a length long enough to enable the same to be fastened to the pressure pad body 132 through a corresponding one of the guide bolt holes 116, and each of the guide pins 143 is formed to have a length shorter than a length of the guide bolt 142.

The guide pins 143 are respectively inserted into the guide bolt holes 116, and the guide bolts 142 respectively pass through the guide pins 143 to be fastened to the pressure pad body 132.

Additionally, the compression bolts 145 and 146 of the compression bolt unit 141 are formed of the first compression bolts 145 having short lengths and the second compression bolts 146 formed to have lengths longer than those of the first compression bolts 145.

In addition, the compression bolts 145 and 146 are respectively fastened to the three compression bolt holes 117 formed in a row, and the compression bolts 145 and 146 are alternately fastened thereto, thereby enabling the pressure pad body 132 to be evenly compressed toward the center line of the amplifier 10.

That is, as shown in FIG. 4, the first compression bolts 145 are fastened in this order. A first compression bolt 145a on the left is fastened, a first compression bolt 145b on the right is fastened, and finally, a first compression bolt 145c in the middle is fastened.

As described above, since these first compression bolts 145 are alternately fastened, the pressure pad body 132 may be uniformly in close contact with the amplifier 10 without causing deviation of the pre-set angle of the amplifier 10 while the compression bolts 145 are fastened according to the fastening order thereof.

Meanwhile, the first compression bolts 145a, 145b, and 145c may be fastened by changing the fastening order thereof as long as the deviation of the pre-set angle of the amplifier 10 does not occur.

After the first compression bolts 145 are respectively fastened to the compression bolt holes 117, the second compression bolts 146 are fastened to prevent the first compression bolts 145 from being loosened by vibration.

That is, the second compression bolts 146 are fastened after the first compression bolts 145 are fastened.

In the state in which the pressure pad body 132 is in close contact with the amplifier 10, the first compression bolts 145 first press the pressure pad body 132, and then the second compression bolts 146 press the first compression bolts 145, thereby making it possible to adjust external force applied to the pressure pad body 132.

Here, since the first compression bolts 145 and the second compression bolts 146 are fastened to the pressure pad body 132 in the vertical direction, the pressure pad body 132 is pressed from the top of the upper block 112 toward the center line of the amplifier 10 with strong force in the vertical direction.

Accordingly, since the first compression bolts 145 and the second compression bolts 146 are vertically fastened toward the center line of the amplifier 10 in a state in which a horn 11 installed in the amplifier 10 is set, torque (rotational force) of rotating the amplifier 10 is not generated and the deviation of the angle of the amplifier 10 does occur.

That is, since the second compression bolts 146 press the first compression bolts 145 in the vertical direction toward the center line of the amplifier 10, the torque (rotational force) may not be applied to the amplifier 10 and the horn 11, and the second compression bolts 146 may indirectly apply force to the first compression bolts 145.

Accordingly, force applied to the pressure pad body 132 by the compression bolts 145 and 146 may be finely adjusted.

Furthermore, the first compression bolts 145 are applied to the amplifier 10 with minute force by the second compression bolts 146, and the second compression bolts 146 press the first compression bolts 145 in the vertical direction toward the center line of the amplifier 10, thereby making it possible to stably install the amplifier 10 without deviation thereof.

A spring washer (not shown) may be inserted into each of the compression bolt holes 117 and then the first compression bolts 145 may be fastened. The spring washer may prevent loosening of the first compression bolts 145 by applying pressure to the first compression bolts 145.

The setting block member 150 includes a setting block 151 installed on one surface of the fixing block member 110 to adjust the angle of the amplifier 10, and an angle adjustment unit 161 installed in the setting block 151 to adjust the angle of the amplifier 10 passing through the setting block 151.

The setting block 151 includes a through hole 152 formed to allow the amplifier 10 to be installed therethrough, a cutout portion 153 formed to be cut out on the upper portion of the setting block 151 and configured to allow the amplifier 10 to be press-fitted thereinto, a horizontal bolt hole 154 formed at the upper portion of the setting block 151 so that the amplifier 10 is compressed by pressure of the cutout portion 153, and an insert hole 155 formed on one lower portion of the setting block 151 and configured to enable the angle adjustment unit 161 to be installed in the setting block 151.

The setting block member 150 is provided to adjust an installation angle of the amplifier 10, and includes the setting block 151 installed on one surface of the fixing block member 110 and the angle adjustment unit 161 configured to rotate the setting block 151 by a predetermined angle.

The through hole 152 is formed in the setting block 151 to allow the amplifier 10 to be installed therethrough, and the cutout portion 153 is formed on the upper portion of the setting block 151 to compress and fix the amplifier 10 more reliably.

In addition, the horizontal bolt hole 154 is formed at the upper portion of the setting block 151 to narrow a gap of the cutout portion 153, and a bolt (not shown) is provided in the horizontal bolt hole 154 to compress and fix the amplifier 10.

Further, the insert hole 155 is formed at one lower portion of the setting block 151, and an angle adjustment hole 156 is formed in a direction intersecting the insert hole 155.

The angle adjustment unit 161 rotates the setting block 151 with respect to the fixing block member 110, and the angle adjusting unit 161 includes an insert frame 162 coupled to the insert hole 155.

An angle adjustment bolt 163 is installed in the insert frame 162, an angle adjustment bracket 164 is coupled to the angle adjustment bolt 163, and a fixing bracket 165 is installed in the angle adjustment bracket 164.

A bolt hole is formed in the fixing bracket 165 to be fixed to the upper block 112.

The angle adjustment unit 161 may rotate the setting block 151 and the amplifier 10 by a predetermined limited angle by rotating the angle adjustment bolt 163 clockwise or counterclockwise.

That is, when the angle adjustment bolt 163 is rotated clockwise or counterclockwise, the insert frame 162 coupled to the insert hole 155 is moved depending on a change in length of the angle adjustment bolt 163.

Accordingly, the angle adjustment bolt 163 rotates the setting block 151 to a desired angle, and the angle of the amplifier 10 coupled to the setting block 151, that is, the horn 11 may be adjusted.

The setting block member 150 and the angle adjustment unit 161 are no longer necessary after completing the angle adjustment of the horn 11. Therefore, after the amplifier compression member 130 of the horn fixing device of the ultrasonic welding device for the secondary battery tab is compressed and fixed to the amplifier 10, the setting block member 150 and the angle adjustment unit 161 may be removed from the ultrasonic welding device for the secondary battery tab, or the same may be left as they are if replacement of the horn 11 is frequently performed.

Figure 8A:
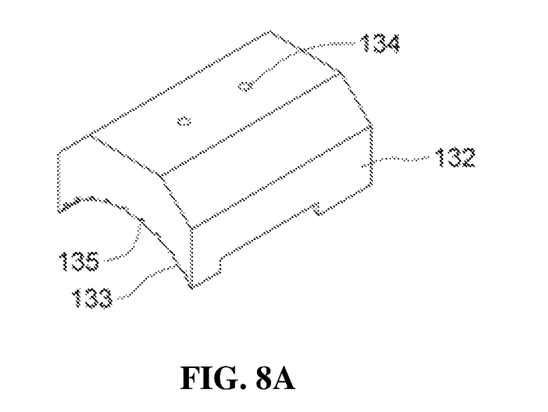
FIGS. 8A and 8B are three-dimensional views showing an amplifier compression member of a horn fixing device of an ultrasonic welding device for a secondary battery tab according to another preferred embodiment of the present invention.
Figure 8B:
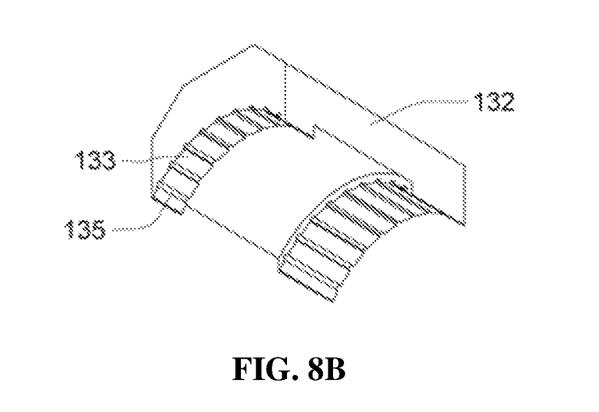

FIGS. 8A and 8B are three-dimensional views showing an amplifier compression member of a horn fixing device of an ultrasonic welding device for a secondary battery tab according to another preferred embodiment of the present invention.

FIGS. 8A and 8B are diagrams showing the amplifier compression member according to another embodiment of the present invention. Here, FIG. 8A is a three-dimensional view, and FIG. 8B is a bottom three-dimensional view.

As shown in FIGS. 8A and 8B, a plurality of close contact grooves 135 are formed at a predetermined distance on the amplifier compression surface 133 of the pressure pad body 132.

The close contact grooves 135 are in close contact with the outer surface of the amplifier 10 by force (external force) applied in the vertical direction from the first and second compression bolts 145 and 146 fastened to the upper block 112.

That is, while the close contact grooves 135 are uniformly deformed by the external force applied to the pressure pad body 132, a large area of each of the close contact grooves 135 closely and strongly contacts the amplifier 10. In this manner, when the amplifier 10 is compressed and fixed using the amplifier compression member 130, fixing pressure may be uniformly applied to the amplifier 10 by the tightening of the compression bolts without deviation of the pre-set angle of the amplifier 10.

Meanwhile, although each of the close contact grooves 135 is shown as a quadrangle, it is needless to say that the same may be formed in various shapes such as a triangle, a circle, or an oval.

Next, a description will be given as to operation of the horn fixing method of the ultrasonic welding device for the secondary battery tab according to the preferred embodiment of the present invention with reference to FIGS. 1 to 9.

Figure 9:
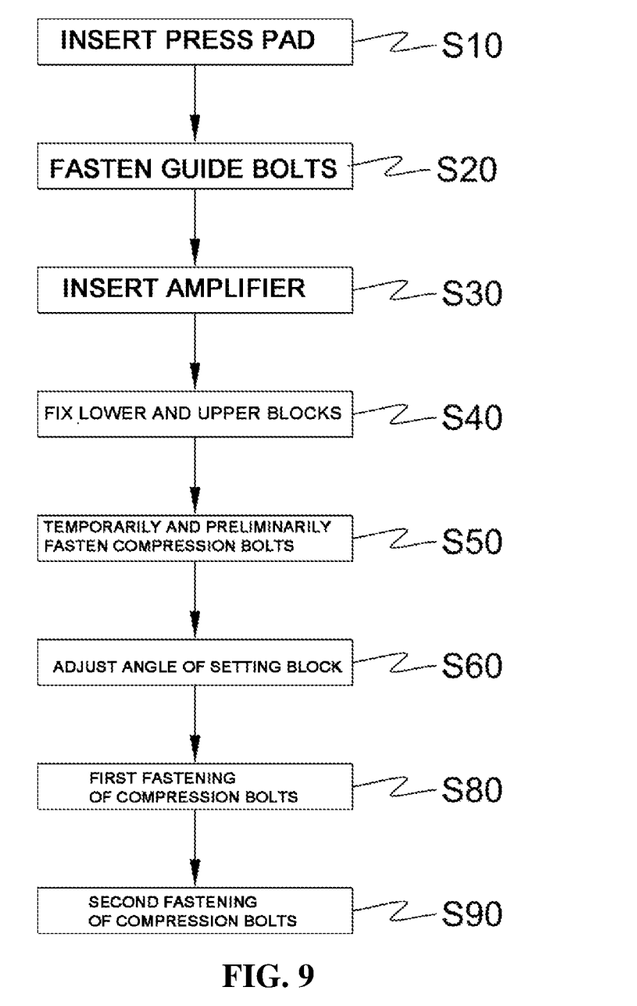
FIG. 9 is a flowchart showing a horn fixing method of the ultrasonic welding device for the secondary battery tab according to another preferred embodiment of the present invention.

FIG. 9 is a flowchart showing a horn fixing method of the ultrasonic welding device for the secondary battery tab according to another preferred embodiment of the present invention.

As shown in FIGS. 1 to 9, as the horn fixing method of the ultrasonic welding device according to the embodiment of the present invention, there is provided a horn fixing method of an ultrasonic welding device, configured to weld a secondary battery tab using the ultrasonic welding device and to fix a horn, the horn fixing method including inserting the pressure pad unit 131 into the pad insertion space part 114 of the fixing block member 110 (S10), fastening the guide bolts 142 to the pressure pad unit 131 so that the pressure pad unit 131 is positioned at a correct position (S20), inserting the amplifier 10 into the amplifier through hole 113 of the fixing block member 110 (S30), fixing the lower block 111 and the upper block 112 by fastening a bolt to the vertical bolt hole 115 of the fixing block member 110 (S40), temporarily and preliminarily fastening each of the first compression bolts 145 of the compression bolt unit 141 to a corresponding one of the compression bolt holes 117 formed in the upper block 112 to press and fix the amplifier 10 to such an extent that an angle of the amplifier 10 is adjustable (S50), adjusting, by the angle adjustment unit 161, the setting block 151 installed on one side of the fixing block member 110 to obtain an angle suitable for operation of the ultrasonic horn 11 (S60), and respectively fastening the first compression bolts 145 and the second compression bolts 146 of the compression bolt unit 141 to the compression bolt holes 117 formed in the upper block 112 to press and fix the amplifier 10 (S70).

The pressure pad body 132 capable of pressing and fixing the amplifier 10 is inserted into the pad insertion space part 114 of the upper block 112 (S10).

After the guide pins 143 are respectively inserted into the guide bolt holes 116, the guide bolts 142 are respectively fastened to the guide bolt holes 134 of the pressure pad body 132 (S20).

Accordingly, the pressure pad unit 131 of the amplifier compression member 130 is stably installed in the upper block 112.

The amplifier 10 is inserted into the amplifier through hole 113 of the fixing block member 110 (S30).

Accordingly, the lower block 111 is positioned at the lower portion of the amplifier 10, and the pressure pad body 132 is positioned at the upper portion of the amplifier 10.

In addition, bolts (not shown) are respectively fastened to the vertical bolt holes 115 of the lower block 111 and the upper block 112 to integrate the lower block 111 and the upper block 112 of the fixing block member 110 (S40).

Each of the first compression bolts 145 of the compression bolt unit 141 is temporarily and preliminarily fastened to a corresponding one of the compression bolt holes 117 formed in the upper block 112 to press and fix the amplifier 10 to such an extent that the angle of the amplifier 10 is adjustable (S50).

The angle of the amplifier 10 is adjusted by the setting block 151 installed on one surface of the fixing block member 110 (S60).

That is, the angle adjustment unit 161 may rotate the amplifier 10 by rotating the angle adjustment bolt 163 clockwise or counterclockwise, and the amplifier 10 may be rotated at a desired angle by the setting block 151 (S60).

In this manner, the first compression bolts 145 and the second compression bolts 146 are fastened in the state in which angle adjustment of the amplifier 10 is completed (S70).

The fastening of the first compression bolts 145 and the second compression bolts 146 (S70) includes temporarily and preliminary fastening each of the first compression bolts 145 of the compression bolt unit 141 to the corresponding one of the compression bolt holes 117 formed in the upper block 112 to press and fix the amplifier 10 to such an extent that the angle of the amplifier 10 is adjustable (S50), completing the fastening of each of the first compression bolts 145 temporarily and preliminarily fastened to the corresponding one of the plurality of compression bolt holes 117 formed in the upper block 112 so that the first compression bolts 145 are in close contact with the upper surface of the pressure pad unit 131 (S80), and fastening each of the second compression bolts 146 to a corresponding one of the upper surfaces of the first compression bolts 145 so that the first compression bolts 145 are pressed by the second compression bolts 146, and fastening the second compression bolts 146 so that the amplifier 10 is pressed by the first compression bolts 145 and the second compression bolts 146 (S90).

After each of the first compression bolts 145 is completely fastened to the corresponding one of the compression bolt holes 117, each of the second compression bolts 146 is fastened to the corresponding one of the upper surfaces of the first compression bolts 145 (S90).

The first compression bolts 145 and the second compression bolts 146 are respectively fastened to the compression bolt holes 117 formed in the upper block 112, and the three first compression bolts 145 are alternately fastened thereto.

Accordingly, the pressure pad body 132 uniformly compresses the outer surface of the amplifier 10, thereby pressing and fixing the amplifier 10.

In this manner, setting of the amplifier 10 may be completed by the pressure pad body 132 within 5 minutes with an error of about 0.01° without deviation of the amplifier 10.

As described above, by fastening of the first compression bolts 145 and the second compression bolts 146, an amount of deviation from the pre-set angle of the amplifier 10 is significantly reduced. Further, since the first compression bolts 145 and the second compression bolts 146 disposed in a row at an equal distance are fastened while movement directions thereof vertically pass through the center line of the amplifier 10, torque of rotating the amplifier 10 is not generated due to force applied to the amplifier 10 by fastening the first compression bolts 145 and the second compression bolts 146. As a result, the amount of deviation from the pre-set angle of the amplifier 10 is significantly reduced.

Although the invention made by the present inventor has been described in detail according to the above-described embodiments, it should be understood that the present invention is not limited to the embodiments and may be changed in various ways without departing from the sprit and scope thereof.

As is apparent from the above description, a horn fixing device and a horn fixing method of an ultrasonic welding device for a secondary battery tab according to the present invention has the following effects.

An amplifier may be uniformly pressed by a pressure pad unit, thereby making it possible to set the amplifier without deviation thereof, and the amplifier may be set more precisely by first and second compression bolts vertically fastened. Further, the amplifier may be set precisely within an error of about 0.01°, and the amplifier may be quickly set without repeated angle adjustment thereof, thereby having an effect of precisely setting the amplifier within about 5 minutes.

In addition, the first compression bolts are fastened, and then the second compression bolts are additionally fastened, thereby having an effect of preventing loosening of the bolts due to vibration generated in an ultrasonic oscillator.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A horn fixing device of an ultrasonic welding device for a secondary battery tab, the horn fixing device comprising:
   an amplifier for ultrasonic welding of the secondary battery tab;
   a fixing block member having an amplifier through hole formed therein and configured to allow the amplifier to be installed therethrough, the fixing block member having a pad insertion space formed at an upper portion of the amplifier through hole, wherein the pad insertion space allows an amplifier compression member to be installed therein;
   the amplifier compression member installed in the pad insertion space so as to compress the amplifier placed in the amplifier through hole; and
   a setting block member installed on one surface of the fixing block member to adjust an angle of the amplifier,
   wherein the setting block member comprises:
   a setting block installed on the one surface of the fixing block member to adjust the angle of the amplifier; and
   an angle adjustment unit installed in the setting block to adjust the angle of the amplifier passing through the setting block, and
   wherein the setting block comprises:
   a through hole formed to allow the amplifier to be installed therethrough;
   a cutout portion formed to be cut out on an upper portion of the setting block so that the amplifier is press-fitted therein;
   a horizontal bolt hole formed at the upper portion of the setting block so that the amplifier is compressed by pressure of the cutout portion; and
   an insert hole formed on one lower portion of the setting block and enabling the angle adjustment unit to be installed in the setting block.
2. The horn fixing device according to claim 1, wherein the fixing block member comprises:
   a lower block and an upper block separately formed in a vertical direction to place the amplifier therebetween;

the amplifier through hole formed to allow the amplifier to be installed through the lower block and the upper block;

the pad insertion space formed to extend at the upper portion of the amplifier through hole;

guide bolt holes formed to be spaced apart from each other by a first distance on an upper surface of the upper block and configured to enable guide bolts to be fastened to the amplifier compression member therethrough; and a plurality of compression bolt holes formed to be spaced apart from each other by a second distance on the upper surface of the upper block so as to press the amplifier compression member in the vertical direction and compress the amplifier compression member therethrough.

3. The horn fixing device according to claim 1, wherein the amplifier compression member comprises:
a pressure pad unit installed in the pad insertion space; and
a compression bolt unit configured to enable the pressure pad unit to press and fix the amplifier,
wherein the pressure pad unit comprises:
a pressure pad body;
an amplifier compression surface formed to correspond to an upper surface of the amplifier; and
guide bolt holes formed in an upper surface of the pressure pad body and configured to allow guide bolts of the compression bolt unit to be fastened thereto.

4. The horn fixing device according to claim 3, wherein the compression bolt unit comprises:
the guide bolts respectively fastened to the guide bolt holes;
guide pins respectively installed on outer sides of the guide bolts to facilitate insertion of the guide bolts;
first compression bolts respectively fastened to a plurality of compression bolt holes formed on an upper surface of an upper block, wherein the first compression bolts press the pressure pad body to allow the amplifier compression surface to compress the amplifier; and
second compression bolts respectively fastened to upper portions of the first compression bolts so as to press the first compression bolts respectively fastened to the plurality of compression bolt holes.

5. The horn fixing device according to claim 2, wherein the plurality of compression bolt holes are formed in a row at the second distance along a center line of the upper surface of the upper block, a center line of an ultrasonic oscillator and the amplifier and the center line of the upper surface of the upper block are parallel to each other, and the plurality of compression bolt holes are formed to vertically intersect the center line of the ultrasonic oscillator and the amplifier.

6. The horn fixing device according to claim 4, wherein:
the plurality of compression bolt holes vertically intersect tightening directions of the first compression bolts with a center line of an ultrasonic oscillator and the amplifier so as to prevent generation of torque that causes the amplifier to deviate from a pre-set angle when each of the first compression bolts is sequentially fastened to a corresponding one of the plurality of compression bolt holes, the second compression bolts are respectively fastened to the upper portions of the first compression bolts so as to prevent the first compression bolts from being loosened due to vibration generated in the ultrasonic oscillator, and when the first and second compression bolts arranged in a row at an equal distance are fastened, movement directions thereof vertically pass through the center line of the amplifier so as to prevent generation of torque that causes rotation of the amplifier due to force applied to the amplifier when the first and second compression bolts are fastened, and to minimize deviation of the amplifier from the pre-set angle when the first and second compression bolts are fastened.

7. A horn fixing method of an ultrasonic welding device, for welding a secondary battery tab using the ultrasonic welding device and for fixing a horn, the horn fixing method comprising:
inserting a pressure pad unit into a pad insertion space of a fixing block member;
fastening guide bolts to the pressure pad unit so that the pressure pad unit is positioned at a position;
inserting an amplifier into an amplifier through hole of the fixing block member;
fixing a lower block and an upper block by fastening a bolt to a vertical bolt hole of the fixing block member;
temporarily and preliminarily fastening each of first compression bolts of a compression bolt unit to a corresponding one of compression bolt holes formed in the upper block to press and fix the amplifier to an extent that an angle of the amplifier is adjustable;
adjusting, by an angle adjustment unit, a setting block installed on one side of the fixing block member to obtain an angle suitable for operation of an ultrasonic horn; and
respectively fastening the first compression bolts and second compression bolts of the compression bolt unit to the compression bolt holes formed in the upper block to press and fix the amplifier.

8. The horn fixing method according to claim 7, wherein the fastening of the first compression bolts and the second compression bolts comprises:
temporarily and preliminarily fastening each of the first compression bolts of the compression bolt unit to the corresponding one of the compression bolt holes formed in the upper block to press and fix the amplifier to the extent that the angle of the amplifier is adjustable;
completing the fastening of each of the first compression bolts temporarily and preliminarily fastened to the corresponding one of the compression bolt holes formed in the upper block so that the first compression bolts are in contact with an upper surface of the pressure pad unit; and
fastening each of the second compression bolts to a corresponding one of upper surfaces of the first compression bolts so that the first compression bolts are pressed by the second compression bolts, and fastening the second compression bolts so that the amplifier is pressed by the first compression bolts and the second compression bolts.

* * * * *